UNITED STATES PATENT OFFICE.

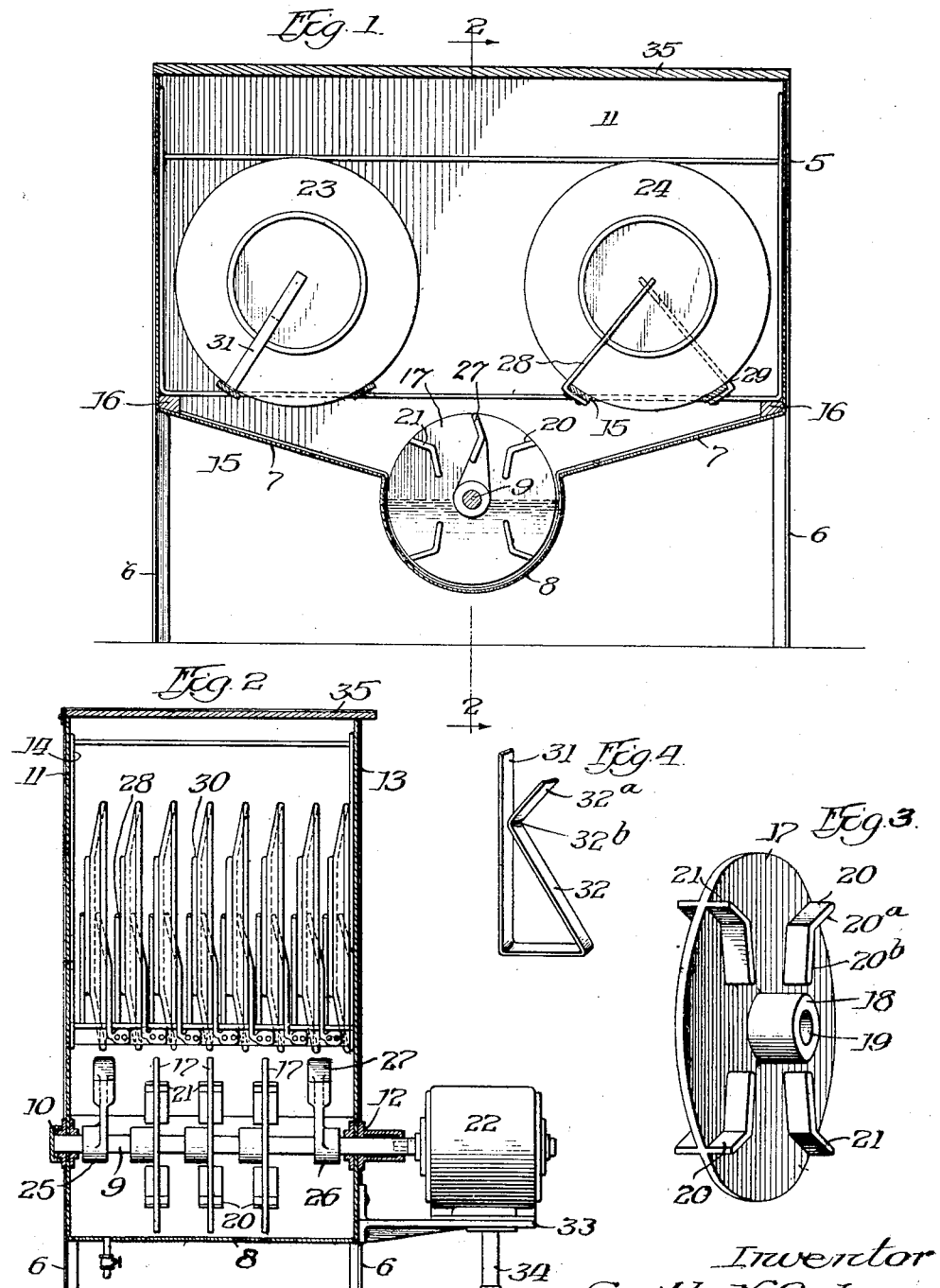

SMITH H. COCHRAN, OF CHICAGO, ILLINOIS.

DISH-WASHING MACHINE.

1,339,810.      Specification of Letters Patent.      Patented May 11, 1920.

Application filed February 27, 1918. Serial No. 219,377.

*To all whom it may concern:*

Be it known that I, SMITH H. COCHRAN, a citizen of the United States, residing at Chicago, in the county of Cook and State of Illinois, have invented certain new and useful Improvements in Dish-Washing Machines, of which the following is a specification.

My invention refers to dish washing machines and particularly to a dish washing machine wherein the dishes are supported and acted upon by an impinging spray of water created by means of a revolving element.

Various attempts have been made to provide dish washing machines which will effectively wash all kinds of dishes irrespective of the kind of food that has been used thereon.

Among the objections to the present day type of machine is the fact that it is impossible to securely hold the dishes for washing without leaving spots where the holding or supporting means engage the dishes, thus necessitating a washing by hand after removal from the machine. A further objection is the impossibility of cleansing dishes that have had greasy food thereon such as butter, eggs and the like. A still further objection is the impracticability of providing a dish washing machine of compact and convenient size, which will efficiently wash dishes under all kinds or conditions of use and in which it is possible to secure a forceful impact of the water against the dishes.

The present invention overcomes the difficulties above recited by providing a rapidly revolving shaft over a water receptacle, providing upon the shaft water projectors of a construction adapted to deliver thin sheet-like sprays of water and providing a dish basket that holds the dishes in groups with their surfaces substantially parallel to the planes of the water sprays so that the impingement of the water sprays against the surfaces of the dishes will effectively cut away the deposit upon the dishes; the effect being realized to its fullest extent by having the water projectors in the form of revolving disks which are adapted to pick up a considerable proportion of the water by frictional contact of the water with the disks, and by having upon the surfaces of these disks blades which still further increase the quantity of water picked up without materially changing the form of the projected water as a thin sheet-like spray impinging against the surfaces of the dishes at a very low angle of incidence; and the capacity of the machine being largely increased by adapting the basket to hold the dishes in groups above and on opposite sides of the vertical plane of the shaft and by having the blades on the disks alternately concaved and convexed in the direction of rotation so that some of the water is sprayed against each of the groups of dishes.

In the accompanying drawings—

Figure 1 is a longitudinal vertical section through the preferred embodiment of my invention showing the relation of the various parts, Fig. 2 is a vertical section on line 2—2 of Fig. 1, Fig. 3 is a perspective view of the preferred form of agitators, and Fig. 4 is a perspective view of the preferred form of spring fingers.

In carrying out the preferred embodiment of my invention I provide a casing 5 supported above the floor by suitable legs 6. The shape of the casing may be of any convenient form, it is preferably rectangular, the size depending upon the quantity of dishes to be washed at one time, the preferred size being that for domestic use and which will conveniently receive platters such as are used in households. The lower portion of the casing 5 is provided with downwardly inclined bottom members 7 terminating in an intermediate transverse water receptacle 8 which receptacle is substantially semi circular in cross section as viewed in Fig. 1. Extending transversely of the casing through the receptacle 8 is a shaft 9 carried in a suitable end bearing 10 in the back wall 11 and extending through a bearing and stuffing box 12 in the front walls 13 of the casing. Mounted on the shaft 9 are a series of agitators or splashers which will be more fully explained hereinafter. Adapted to be received within the casing 5 is a basket having handles 14 and a plurality of cross bars 15, the whole being adapted to rest at the upper edges of the sloping portions 7 of the bottom. If desired, the basket may rest on blocks or supports 16, the whole being arranged so that the bottom of the basket is above the upper portion of the agitators.

I have found that if the water is picked up and hurled violently against the dishes in sprays that are directed approximately in the planes of the dishes or at very low angles of incidence and the sprays are relatively thin in dimension transverse to the plane of impingement, or in other words constitute sheet-like sprays so that the deposit upon the dishes will be separated from their surfaces the dishes will be effectively cleaned. I have discovered that it is possible to cleanse the dirtiest dishes without soap and with cold water by hurling small particles of water violently thereagainst. One of the important features of my invention resides in the construction of the means to pick up the water from the receptacle 8 and hurl it violently against the dishes. I have disclosed two forms of such means which act as water projectors or splashers, both of which have been tested with various kinds of dishes and both of which have been proved very satisfactory in use. The preferred form of projector comprises a disk 17, preferably imperforate, having formed thereon a hub 18 provided with a central aperture 19 for surrounding the shaft 9. The hub is securely fastened to the shaft in any desired manner preferably by means of a set screw (not shown) extending therethrough, although any other means may be employed for mounting the hubs so as to be non-rotatably carried by the shaft. On the disk 17 I prefer to mount a series of narrow blades 20, 21, these preferably being mounted on each side of the disk 17. Every one of the blades 20 and 21 is formed with two portions $20^a$, $20^b$, maintained in angular relation with each other forming deflecting or kicking surfaces and gathering surfaces on the blades; that is, some of the blades are convexed to the direction of travel while others are concaved thereto; in other words, the blades are alternately concaved and convexed on their sides presented in the direction of travel; the convexed side of the blade permitting some of the picked up water to pass off in the direction to reach the group of dishes 24, and the concaved faces retaining the water longer but permitting some of it to escape toward the group of dishes 23; the spray, however, driving as a continuous sharply impinging sheet against the surfaces of the dishes and against dishes arranged in between the groups as well as against those in the two groups on either side of the vertical plane of the shaft. I prefer to mount a portion of these with the inclined or bent portion extending in one direction of rotation and a portion with the inclined or bent portion in the opposite direction of rotation. As arranged in Fig. 1, the disks 17 are adapted to rotate in counterclockwise direction by means of a prime mover such as an electric motor 22 suitably connected to the shaft 9. I have found that the best results are secured when the shaft is rotated at a high speed preferably 1700 to 1800 revolutions per minute. I have found also that it is possible to secure this high speed and effectively wash dishes in what I term a household size machine by means of an electric motor of $\frac{1}{4}$ horse power. Aside from being of a form that projects a comparatively thin spray of water, and therefore avoids displacing the main body of water from the receptacle, the form of the blades permits very high revolution of the projectors and thereby favors the development of the cutting spray. In the arrangement shown, I prefer to mount the dishes edgewise with respect to the direction of the throw of the water and with the dishes substantially vertical. If desired, the dishes might be inclined horizontally and vertically with respect to the plane of rotation of the disks and thus offer a greater surface to the violently hurled drops of water.

Another form of agitator which I have found to be effective is that shown mounted on the ends of the shaft 9 and designated by the characters 25, 26. These agitators are in the form of a narrow arm with a hub similar to that of the hub 18 on the disk 17 for embracing the shaft 9. The outer ends of the arms are provided with flattened portions 27 which are bent or curved similarly to the blades 21 shown on the disk 17 for the purpose of developing a sheet-like spray similar to that developed by the curved blades on the disk 17 when the arms are substituted for the disks, the width of the blade being just sufficient to develop a sheet-like spray instead of one where the water is thrown in larger quantities. I have found that when these arms are rotated rapidly the effect is practically the same as that achieved with the disks 17, and the blades 20, 21, but disk 17 increases the projecting efficiency. An efficient combination is to mount several of the disks 17 as shown in Fig. 2 and also arms 25, 26, at the outer ends of the shaft, that is, on the portions of the shaft near the outside walls of the casing. The less difficult cleaning can be left to the vanes without the disks. In this way all of the dishes are subjected to a sheet-like spray of water hurled with great violence thereagainst. The time of operation of the agitators of course, is dependent on the dishes when in the washing machine. I have found by repeated experiments that a quantity of dishes can be effectively washed by the machine herein described, in hot water, in not more than one minute and in cold water, in not more than five minutes. After the dishes have been washed by the machine, if desired, the dirty water may be drawn off through a valve controlled outlet in the bottom of the receptacle 8 and clean hot water put into the receptacle which when projected as before will rinse the dishes. If, however, several lots are to be washed, it may be desirable to remove the baskets holding the dishes and pour hot water over them allowing the dishes to stand without drawing off the washing water in the receptacle 8, thus drying without further work.

The means which I prefer to maintain the plates in edgewise position in the basket or holder comprise spring fingers of two forms. One form is that shown at the right hand portion in Fig. 1 and comprises a finger 28 secured to one of the cross bars 15 forming a portion of the basket and adapted to support the back of the plate as may be seen in Fig. 2. Attached to the other cross bar 15 of the basket is a finger 29 having the upper portion thereof bent to afford a point contact with the plate, as shown in Fig. 2. It will thus be observed that the plates are maintained between the spring fingers 28, 29, the fingers 28 bearing against the bead 30 on the back of the plate and the finger 29 making a point contact with the face of the plate, thus subjecting all of the back of the plate and all of the face of the plate to the action of the washing water. In the form shown at the left hand portion of Fig. 1 I provide a U-shaped spring finger having a back portion 31 and a front portion 32, the same being formed out of a single piece of metal and suitably attached at an intermediate point to one of the cross bars 15 of the basket. The front member 32 is provided with a head portion 32$^a$ which is angularly disposed with respect to the body of the front member, thus forming a shoulder 32$^b$, which bears against the front of the plate making point contact therewith. Under normal conditions the shoulder 32$^b$ rests against the back member 31 with the head 32$^a$ forming a jaw for the reception of the plate. I have been able to insert plates in the spring fingers of this type while paying little attention to the operation as the jaws formed by the upper end of the member 31 and the head 32$^a$ serve as certain guides for the insertion of the plates. In the embodiment of the machine selected for illustration I have shown two rows of plates 23, 24, supported by two pairs of cross bars 15. It is, of course, understood that as many more rows of plates may be provided as is consistent with the capacity of the machine which is determined both by the size of the casing and the sizes of the agitators. The length of the machine is as before stated made large enough to receive any large household platter or similar disk which is constantly in use.

For washing cups, bowls, and the like, I employ a wire basket of usual form which is inserted in the casing 5 and supported on the supports 16 wherein the cups, bowls and the like are turned up-side-down so that the interiors will be subjected to the spray of water hurled by the agitators. Silverware may be washed by putting in with the cups and the like, if desired, or separately in the basket.

As a prime mover I have shown an electric motor 22 as connected to the shaft 9, yet, I do not wish to limit my invention thereto as any suitable source of power properly geared to the shaft 9 to produce a high speed will be sufficient. I have endeavored to design my machine so that it may be operated with a small motor such as is in use in households and have found that one with a rating of preferably $\frac{1}{6}$ horse power is sufficient to operate my machine. By providing a sliding connection between the motor 22 and the shaft 9 and mounting a fly wheel on the motor I am able to operate other household utensils such as meat choppers, bread mixers and the like. A motor with a capacity of $\frac{1}{4}$ horse power is of sufficient size to operate a clothes washing machine. Hence, any household having a clothes washing machine and a dish washing machine of the type of my invention may be mechanically operated by means of an electric motor not greater than $\frac{1}{6}$ horse power to $\frac{1}{4}$ horse power.

For mounting the motor to operate the shaft 9 I have provided a shelf 33 securely fastened to the face 13 of the casing and if desired provided with a depending post 34 as an additional means of support. The motor 22 may be slidably mounted on the bracket 33 so as to be moved inwardly for connection with the shaft 9 and outwardly for disconnection thereof, or removed entirely for use with other household utensils. If desired, a meat chopper or the like may be clamped to the upper side of the member 13 of the casing and operated by the motor 22 without removing the motor from the bracket. The top of the casing is covered by the usual cover 35 hinged preferably to the back edge of the rear wall 11 and provided with the usual handles and stops (not shown).

The operation of the device is as follows:
Plates or the like are inserted in the basket between the spring fingers 28, 29, or 31, 32, and the basket placed in the casing and the top 35 then closed, a suitable amount of hot or cold water with or without additions of soap or the like having been introduced into the receptacle 8 to extend preferably not above the shaft 9. The motor is then operated and the water projectors effect a complete washing of the dishes by hauling the water violently against the dishes in a sheet-like spray. The motor is continued a sufficient length of time as practice may teach to properly cleanse the dishes in the machine. As before described when the dishes are cleansed, the basket may be removed and hot water poured over the dishes and the dishes allowed to stand until dry. Or the washing water may be removed and clean rinsing water introduced into the machine which will rinse the dishes by operation of the motor.

I am aware that modifications of such machines are possible and such modifications as come within the scope of the appended claims I consider as coming within the scope of my invention.

I claim:—

1. A dish washing machine comprising a water receptacle, a horizontal shaft revolving in said receptacle, a series of narrow water projectors on said shaft constructed to deliver from the receptacle a series of parallel sheet-like sprays, and a dish basket adapted to hold dishes in groups and present them to the sprays with their surfaces substantially parallel to the planes of the sprays; said water projectors comprising circular disks revolving co-axially with the shaft, and blades upon the faces of said disks, the blades being alternately concaved and convexed to the direction of rotation.

2. A dish washing machine comprising a water receptacle, a horizontal shaft revolving in said receptacle, a series of narrow water projectors on said shaft constructed to deliver from the receptacle a series of parallel sheet-like sprays, and a dish basket adapted to hold dishes in groups and present them to the sprays with their surfaces substantially parallel to the planes of the sprays; the basket being adapted to present the dishes in two groups above and on opposite sides of the vertical axial plane of the shaft, and said projectors comprising circular disks revolving co-axially with the shaft and having on their faces, blades that are alternately concaved and convexed to the direction of rotation.

Signed at Chicago, State of Illinois, this 5th day of February, A. D. 1918.

SMITH H. COCHRAN.